United States Patent
Özgür et al.

(10) Patent No.: US 10,377,231 B2
(45) Date of Patent: Aug. 13, 2019

(54) MAGNET-ASSISTED BALL DRIVE

(71) Applicant: ECOLE POLYTECHNIQUE FEDERALE DE LAUSANNE (EPFL), Lausanne (CH)

(72) Inventors: Ayberk Özgür, Lausanne (CH); Séverin Lemaignan, Plymouth (GB); Wafa Johal, Lausanne (CH); Francesco Mondada, Bussigny (CH); Pierre Dillenbourg, Givrins (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 198 days.

(21) Appl. No.: 15/648,425

(22) Filed: Jul. 12, 2017

(65) Prior Publication Data

US 2019/0016213 A1   Jan. 17, 2019

(51) Int. Cl.
*B60K 17/04* (2006.01)
*B60B 19/14* (2006.01)
*B60B 19/00* (2006.01)
*B60K 7/00* (2006.01)

(52) U.S. Cl.
CPC .......... *B60K 17/043* (2013.01); *B60B 19/003* (2013.01); *B60B 19/14* (2013.01); *B60K 7/0007* (2013.01); *B60B 2900/931* (2013.01); *B60K 2007/0046* (2013.01); *B60K 2007/0061* (2013.01); *B60Y 2200/40* (2013.01)

(58) Field of Classification Search
CPC ................ B60K 17/043; B60K 7/0007; B60K 2007/0046; B60B 19/003; B60B 19/14; B60B 2900/931; B60Y 2200/40
See application file for complete search history.

(56) References Cited

U.S. PATENT DOCUMENTS

| | | | |
|---|---|---|---|
| 4,700,581 A | 10/1987 | Tibbals, Jr. | |
| 4,785,899 A | 11/1988 | von Winckelmann | |
| 5,190,504 A * | 3/1993 | Scatterday | A63B 21/00189 473/594 |
| 5,660,596 A * | 8/1997 | Rochefort | A63D 5/08 473/118 |
| 7,891,445 B1 | 2/2011 | McKinley et al. | |
| 8,459,383 B1 | 6/2013 | Burget | |
| 8,600,600 B2 * | 12/2013 | Jung | B60B 19/14 701/22 |

(Continued)

OTHER PUBLICATIONS

Chen et al., "Design and implementation of a ball-driven omnidirectional spherical robot", Mechanism and Machine Theory, vol. 68, 2013, pp. 35-48.

(Continued)

*Primary Examiner* — Anne Marie M Boehler
*Assistant Examiner* — Marlon A Arce
(74) *Attorney, Agent, or Firm* — Maschoff Brennan

(57) ABSTRACT

The present invention concerns a magnet-assisted ball drive. The drive comprises a ball and a drive element in contact with the ball. The drive element is arranged to be rotated around its axis of rotation to drive the ball. The ball and the drive element each comprise magnetic material such that at least one of the ball and the drive element comprises a magnet to generate a magnetic pulling force to pull the ball and the drive element against each other.

18 Claims, 4 Drawing Sheets

(56) References Cited

U.S. PATENT DOCUMENTS

| | | | | |
|---|---|---|---|---|
| 8,820,850 | B2* | 9/2014 | Moser | B60B 33/08 |
| | | | | 301/5.1 |
| 9,174,338 | B2* | 11/2015 | Ouellet | B25J 5/007 |
| 2012/0175853 | A1 | 7/2012 | Scicluna | |
| 2015/0224941 | A1* | 8/2015 | Bernstein | G05D 1/0022 |
| | | | | 180/167 |
| 2017/0239982 | A1* | 8/2017 | Fontaine | B60B 19/003 |
| 2018/0099525 | A1* | 4/2018 | Kim | A63H 33/26 |

OTHER PUBLICATIONS

Endo and Nakamura, "An Omnidirectional Vehicle on a Basketball", 12th International Conference on Advanced Robotics, 2005 (ICAR '05), 2005, pp. 573-578.

Ferriere and Raucent, "ROLLMOBS, a new universal wheel concept", IEEE International Conference on Robotics and Automation, May 1998, pp. 1877-1882.

Gebre et al., "A Multi-Ball Drive for Omni-Directional Mobility", IEEE International Conference on Technologies for Practical Robot Applications (TePRA), Apr. 2014, pp. 1-6.

Ghariblu et al., "Design and Prototyping of Autonomous Ball Wheel Mobile Robots", Mobile Robots—Current Trends, Oct. 2011, pp. 363-374.

Jang et al., "Design and Analysis of Ultrasonic Motor for Driving Sphere Wheel", Ferroelectrics, vol. 459, Issue 1, 2014, pp. 68-75.

Kumagai and Hollis, "Development and Control of a Three DOF Spherical Induction Motor", IEEE International conference on Robotics and Automation (ICRA), May 2013, pp. 1528-1533.

Kumagai and Ochiai, "Development of a Robot Balancing on a Ball", International Conference on Control, Automation and Systems (ICCAS), Oct. 2008, pp. 433-438.

Kumagai, "Development of a Ball Drive Unit using Partially Sliding Rollers—An alternative mechanism for semi-omnidirectional motion", IEEE/RSJ International Conference on Intelligent Robots and Systems (IROS), 2010, pp. 3352-3357.

Lauwers et al., "A Dynamically Stable Single-Wheeled Mobile Robot with Inverse Mouse-Ball Drive", IEEE International Conference on Robotics and Automation, 2006 (ICRA 2006), May 2006, pp. 2884-2889.

Lee et al., "Control of a redundant, reconfigurable ball wheel drive mechanism for an omnidirectional mobile platform", Robotica (2007), vol. 25, Issue 4, 2007, pp. 385-395.

Mourioux et al., "Omni-directional robot with spherical orthogonal wheels: concepts and analyses", Proceedings of the 2006 IEEE International Conference on Robotics and Automation, 2006 (ICRA 2006), May 2006, pp. 3374-3379.

Ok et al., "SO(2) and SO(3), Omni-Directional Personal Mobility with Link-Driven Spherical Wheels", IEEE/RSJ International Conference on Intelligent Robots and Systems (IROS), Sep. 2011, pp. 268-273.

Özgür et al., "Permanent Magnet-Assisted Omnidirectional Ball Drive", IEEE/RSJ International Conference on Intelligent Robots and Systems (IROS), Oct. 2016, pp. 1061-1066.

Runge et al., "Design and Testing of a 2-DOF Ball Drive", An Omnidirectional Wheel for Mobile Robots, Journal of Intelligent & Robotic Systems, vol. 81, Issue 2, Feb. 2016, pp. 195-213.

Tadakuma, Kenjiro and Tadakuma, Riichiro, "Mechanical Design of "Omni-Ball": Spherical Wheel for Holonomic Omnidirectional Motion", IEEE International Conference on Automation Science and Engineering, 2007 (CASE 2007), Sep. 2007, pp. 788-794.

West and Asada, "Design of Ball Wheel Mechanisms for Omnidirectional Vehicles With Full Mobility and Invariant Kinematics", Journal of Mechanical Design, vol. 119, Issue 2, Jun. 1997, pp. 153-161.

Yu et al., "Development of an omnidirectional Automated Guided Vehicle with MY3 wheels", Perspectives in Science, vol. 7, 2015, pp. 364-368.

* cited by examiner

MAGNET-ASSISTED BALL DRIVE

TECHNICAL FIELD

The present invention relates to a magnet-assisted ball drive, which may be used for instance in robotic applications. More specifically, the proposed magnet-assisted ball drive comprises a ball driven by a drive element, where the ball and the drive element are magnetically held in contact with each other.

BACKGROUND OF THE INVENTION

Locomotion systems can be used in various applications, such as robotics. Aspects relating to locomotion in robotics are concerned with designing powered mechanisms that allow robots to move in their environments. The present description focuses on terrestrial locomotion, which is concerned with moving on land upon rigid structures (such as the tops of desks and tables or the ground) and is distinct from aerial, aquatic or other types of locomotion. From another perspective, locomotion can be divided into indoor and outdoor applications, which usually impose distinct requirements on the locomotion system that is built. These include:
- robustness against obstacles in the environment, or the inherent structure of the environment, such as natural rough terrain;
- robustness against external disturbances;
- mechanical durability and complexity;
- monetary cost, affordability;
- power consumption, efficiency;
- precision;
- physical compactness, size and shape; and
- kinematic constraints, e.g. holonomic vs. non-holonomic.

Considering these requirements, the locomotion literature converged to two distinct types of systems, which are legged and wheeled systems. Legged systems generally offer high robustness against rough environments at the cost of a higher number of degrees of freedom (DOFs), more complexity and more cost. Therefore, they address mainly, though not exclusively, outdoor scenarios. On the other hand, wheeled systems generally offer less robustness against rough environments (or are not concerned at all with such environments) but are much simpler and more efficient. As a result, they are often preferred, though again not exclusively, when dealing with indoor scenarios.

The locomotion systems considered in the present description preferably fulfill at least some of the following requirements:
- holonomic motion to allow haptic feedback instantaneously in any direction (in x, y and/or θ) when the locomotion system is grasped;
- mechanical robustness against being externally driven;
- design composed of simple, few and preferably off-the-shelf components in order to minimize custom manufacturing steps to ease the transition from a prototype design to a consumer device design;
- as low cost, as possible; and
- compact enough geometry so that the system physically fits inside a handheld volume allowing it to be grasped entirely.

Given the above constraints, legged systems are excluded from consideration and only wheeled systems, which allow three DOF holonomic motions on a substantially horizontal plane, are considered in the following.

It is trivially true that for holonomic motion (requiring instantaneous motion capability toward an arbitrary direction in any configuration), wheels with at least two DOF are required. Here, a large design space exists for the individual and collective kinematics of these wheels. The first prominent example is actively steered wheels that feature two orthogonal DOFs that are both driven. These are simple to build and operate, but require that some time is spent to turn the wheels into the direction of motion if the desired direction changes discontinuously. Thus, these systems are not "instantaneously" omnidirectional. If the wheel is made a caster, it is possible to make omnidirectionality instantaneous. However, some driving elements must still remain on the link that houses the wheel itself in order to ensure that the wheel is driven. This increases complexity and decreases mechanical robustness since this link must itself also rotate to ensure control over the other DOF.

Swedish wheels, also known as Mecanum wheels, omnidirectional wheels or omni wheels, are a second prominent example. These wheels feature two orthogonal or 45° oriented DOFs, one of which is driven while the other one is free to ensure low-friction backdrivability. These can move instantaneously toward any direction but are relatively less simple to build, typically less robust against obstacles and suffer from undesirable vibrations due to discontinuous contact points with the ground.

Ball wheels are a final prominent example, which feature two (or three) non-collinear DOFs, at least one of which is driven and the rest is/are free. Since the spherical wheel appears to have the exact same surface no matter what its orientation is, ball wheels can be made truly isotropic, ensuring the smoothest possible motion. However, they are typically difficult to build and design such that they ensure efficient locomotion. Compared to omni wheel drives, ball drives offer significantly better vibration robustness and easier miniaturization when components of similar sizes are considered. These are important features e.g. for palm-sized robots that should be free of unintentional vibrations, which would disturb the haptic feedback. Ball wheel drives typically use rotating contact elements to drive the ball wheel. However, the contact force between the drive roller and the ball wheel is a challenge, which is conventionally solved by external spring-loaded elements. However, this increases complexity and cost of the system. It is to be noted that the above considerations are not restricted to the field of robotics, but are also valid in fields other than robotics.

SUMMARY OF THE INVENTION

It is an object of the present invention to overcome at least some of the above problems related to ball drives.

According to a first aspect of the invention, there is provided a magnet-assisted ball drive as recited in claim 1.

The proposed new solution has the advantage that compared to existing solutions, the proposed solution has a lower cost and increased miniaturization. The proposed drive:
- can almost fully be made of low cost off-the-shelf components;
- has naturally compact geometry that enables it to fit inside a palm-sized device;
- has equivalent control on drive element contact force with simpler elements, compared to traditional passive mechanisms in other ball drive designs (e.g. spring-loaded passive rollers and drive roller deformation); and
- is robust against physical user interaction by virtue of magnetic force preservation which permits leaving the magnet-wheel assembly unmounted from the frame. In known solutions, this can be achieved by additional mechanisms placed on the outside of the wheels at the additional cost of adding parts. In the present invention, this is obtained for no additional cost.

According to a second aspect of the invention, there is provided a drive entity comprising the magnet-assisted ball drive as recited in claim 15.

According to a third aspect of the invention, there is provided a robot comprising the drive entity as recited in claim 17.

Other aspects of the invention are recited in the dependent claims attached hereto.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF AN EMBODIMENT OF THE INVENTION

Figure 1:
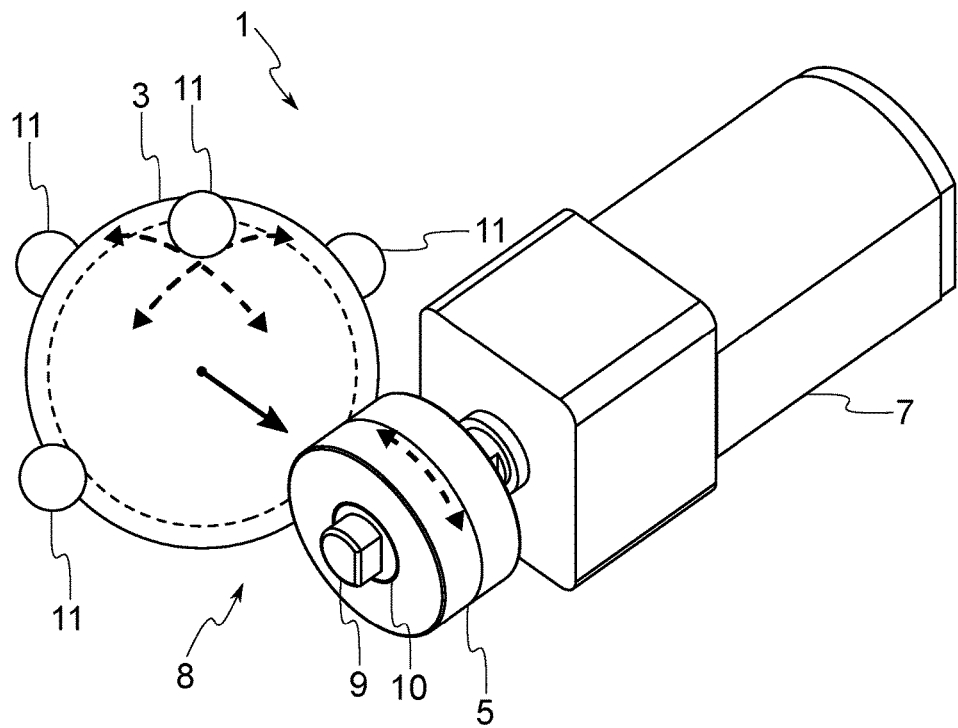
FIG. 1 is a perspective view showing the wheel together with its drive unit and ball transfer units according to an example of the present invention.

An embodiment of the present invention will now be described in detail with reference to the attached figures. This embodiment is described in the context of a wheel for a palm-sized handheld robot, which may be used for novel human-mobile robot interaction scenarios, where users are expected to physically interact with many of these robots. However, the teachings of the invention are not limited to this environment. The teachings of the invention are equally applicable in various other technical fields, such as automotive industry. Identical or corresponding functional and structural elements which appear in the different drawings are assigned the same reference numerals.

FIG. 1 schematically illustrates a magnet-assisted ball drive entity or mechanism 1, which in this example is placed inside a handheld robot. According to this example, the drive entity 1 comprises a substantially spherical element, referred to as a ball wheel 3 or simply a ball, a drive element 5, referred to as a drive wheel or drive roller, for driving the ball wheel 3, and a drive unit 7 for rotating the drive wheel 5. The rotation directions of these wheels are indicated by dashed arrows in FIG. 1. It is to be noted that the ball wheel 3 has one driven axis and one non-driven axis, which are substantially orthogonal. In this example, the ball wheel 3 has a substantially spherical shape, whereas the drive wheel 5 has a substantially cylindrical shape, although the drive wheel 5 could have a substantially spherical shape instead. The ball wheel 3 and the drive wheel 5 together form a wheel 8, also referred to as a ball drive or simply a drive. The drive unit 7 comprises a drive shaft 9 connected and fixed to the drive wheel 5. In this example, the drive wheel 5, which has a substantially circular cross section, acts as a drive roller and comprises a through hole 10 along its longitudinal axis (which is also its axis of rotation) for attaching the drive shaft 9 to the drive wheel 5. The driven axis of the ball wheel 3 is parallel to the rotation axis of the drive wheel. The drive unit 7 may be an electric motor, for instance, or any other suitable element for rotating the drive wheel 5. The drive entity 1 further comprises ball transfer units 11, also referred to as spherical or omnidirectional bearings. The configuration of FIG. 1 comprises four ball transfers 11, but the number of the ball transfers 11 could be greater or smaller. The purpose of the ball transfers 11 is explained later in more detail. According to the present invention, the contact or pulling force (the direction of this force is indicated by a solid arrow in FIG. 1, the driven axis being orthogonal to this arrow) between the ball wheel 3 and the drive wheel 5 is obtained by magnetic or magnetostatic interactions between the ball wheel 3 and the drive wheel 5 as explained later in more detail.

In the example illustrated in FIG. 1, the ball wheel 3 is a passive magnetic element, while the drive wheel 5 comprises a permanent magnet, although it could be a non-permanent instead. In this example, the ball wheel 3 has a ferromagnetic core, such as an iron core, which is not permanently magnetized, and is driven by the drive wheel 5, which is a permanent ring magnet acting as the drive roller. The core is located inside the dashed sphere illustrated in FIGS. 1 and 2. Ferromagnetic materials have a high susceptibility to magnetization, the strength of which depends on that of the applied magnetizing field. Instead of iron, other ferromagnetic materials, such as nickel, cobalt and some of their alloys, could be used. A permanent magnet on the other hand is an object made from a material that is magnetized and creates its own persistent magnetic field. Outside the core, the ball wheel 3 may comprise a high-friction coating, such as a rubber coating, to increase the friction between the ball wheel 3 and the drive wheel 5. The magnet temporarily magnetizes the ball wheel 3, exerting a pull force and generating the necessary normal force for this friction. The ball wheel 3 thus acquires one driven and one free DOF, kinematically equivalent to an omni wheel. With the normal force generated by the magnetostatic interaction (i.e. pull) between the magnet 5 and the ball wheel 3, the magnet 5 can ideally drive the ball wheel 3 around its axis of rotation thanks to the static contact friction while the ball wheel 3 remains free to rotate around the orthogonal axis in the horizontal plane.

In the example of FIG. 1, the magnetostatic interaction stays isotropic regardless of the ball wheel's 3 or drive wheel's 5 orientations, assuming that the ball wheel's 3 core is magnetically isotropic in all directions and the drive wheel 5, which is the magnet in this example, is magnetically isotropic around its rotation axis. Other assumptions for isotropy are that the ball wheel core material is chosen appropriately and the drive wheel 5 rotates slowly enough so that the parasitic forces due to the magnetic after-effect and induced eddy currents in the ball wheel 3 are negligible. In the example of FIG. 1, an axially magnetized ring magnet (poles axially at the first and second ends, i.e. at the top and bottom) is used. Utilizing the magnetostatic interaction to ensure the contact conditions eliminates the need for external elements that would normally ensure these conditions, such as spring loaded passive rollers. In other words, the contact force mechanism is naturally embedded in the ball wheel 3 and the drive wheel 5. Given a ball wheel diameter, the normal force magnitude can be controlled by appropriately choosing the magnet size (analysis follows) and strength.

Figure 2:
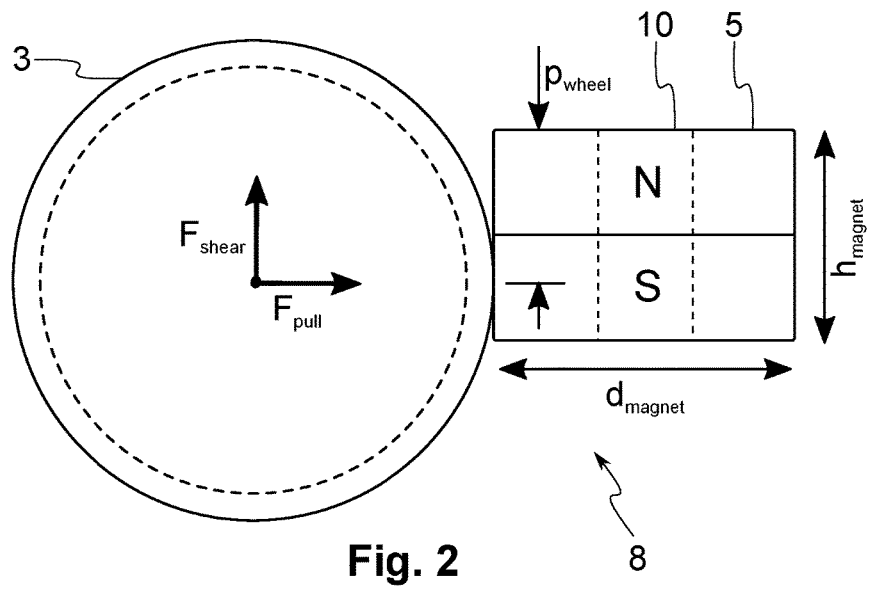
FIG. 2 is a top-down view of the wheel of FIG. 1.

The magnetostatic interaction between the ball wheel 3 and the drive wheel 5 depends on the physical dimensions of both objects. Given such dimensions, it is desirable to know where the ball wheel 3 would rest along the height of the drive wheel 5 (if it rests at all) and how much force will be exerted on it. In order to determine these values, the pull and shear forces $F_{pull}$, $F_{shear}$ on the ball wheel 3 can be calculated using an appropriate software application for fixed ball wheel dimensions and parametric magnet dimensions and position. The shear force $F_{shear}$ is understood to be the force pushing the ball wheel 3 toward its resting position as explained below. The obtained shear forces can then be used to calculate the potential of the ball wheel 3 to determine its resting position (denoted by $p_{wheel}$ in FIG. 2). In FIG. 2, "N" refers to the magnetic north pole, whereas "S" refers to the magnetic south pole. Furthermore, the hashed lines indicate the position of the hole 10 (which does not have to be a through hole) for the drive shaft 9.

There exists a threshold below which the ball wheel 3 rests at the center of the magnet 5, requiring small enough $h_{magnet}$ and large enough magnet depth $d_{magnet}$. For all such known or tested pairs of magnet dimensions, pull force $F_{pull}$ is observed to be symmetric around the resting position. Beyond this threshold, the ball wheel 3 rests at two symmetric positions which quickly move away from the center toward the edges with larger $h_{magnet}$ and smaller $d_{magnet}$, but the ball wheel 3 rests at some position along the magnet (the drive wheel 5 in this scenario) height and is not pulled entirely toward the drive wheel ends (where the hole openings are located) for all the tested dimensions. However, for all such tested pairs of magnet dimensions, $F_{pull}$ is observed to not be symmetric around the resting positions. Finally, it is observed that $F_{pull}$ at resting position(s) tends to increase almost linearly with increasing $d_{magnet}$, but tends to increase and saturate with increasing $h_{magnet}$. Therefore, after a point, there tends to be little or no $F_{pull}$ gain with increased $h_{magnet}$. In view of the above, it is generally advantageous to remain within the single resting position region. It is desirable to have symmetric $F_{pull}$ magnitude around the resting position, since the ball wheel 3 will inevitably move a small amount along the magnet height due to inaccuracies during motions involving its free DOF in a multi-wheel configuration. In this region, the smallest geometrically feasible pair of off-the-shelf dimensions that would ensure enough $F_{pull}$ could be chosen.

The ball wheel 3 is loosely enclosed in a space defined by the drive wheel 5 and four ball transfers 11: one above the ball wheel 3 (bears the weight of the robot for instance), one opposite to the drive wheel 5, and one on the left and one on the right of the ball wheel 3. As a design choice, the wheel (comprised of the ball wheel 3 and the drive wheel 5) and the drive unit 7 are not fixed to the frame 13 of the robot (see FIGS. 3a and 3b) and are thus left free to move along a plane perpendicular to the driven axis. In addition, the ball wheel 3 is left free to move along the driven axis. However, these motions are constrained to be very small by the frame 13 and the ball transfers 11 such that the disturbance on the system's geometry is minimal. The magnetic pull force ensures that the ball wheel-drive wheel contact remains unbroken during these motions.

Figure 3A:
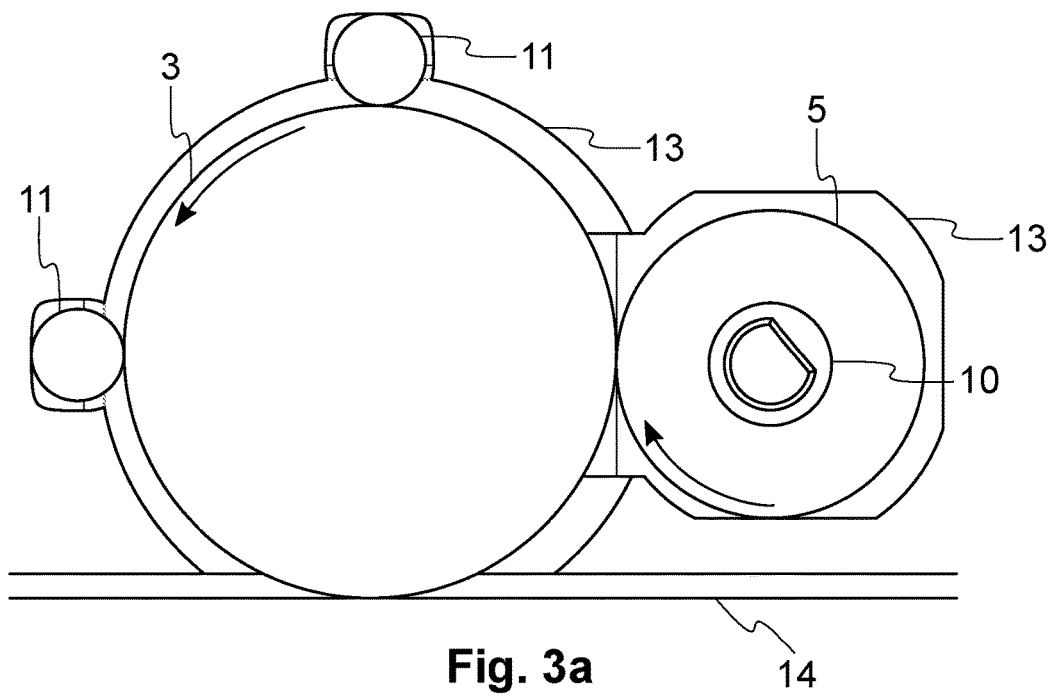
FIGS. 3*a* and 3*b* are cross-sectional side views of the wheel when located in a robot according to an example of the present invention.
Figure 3B:
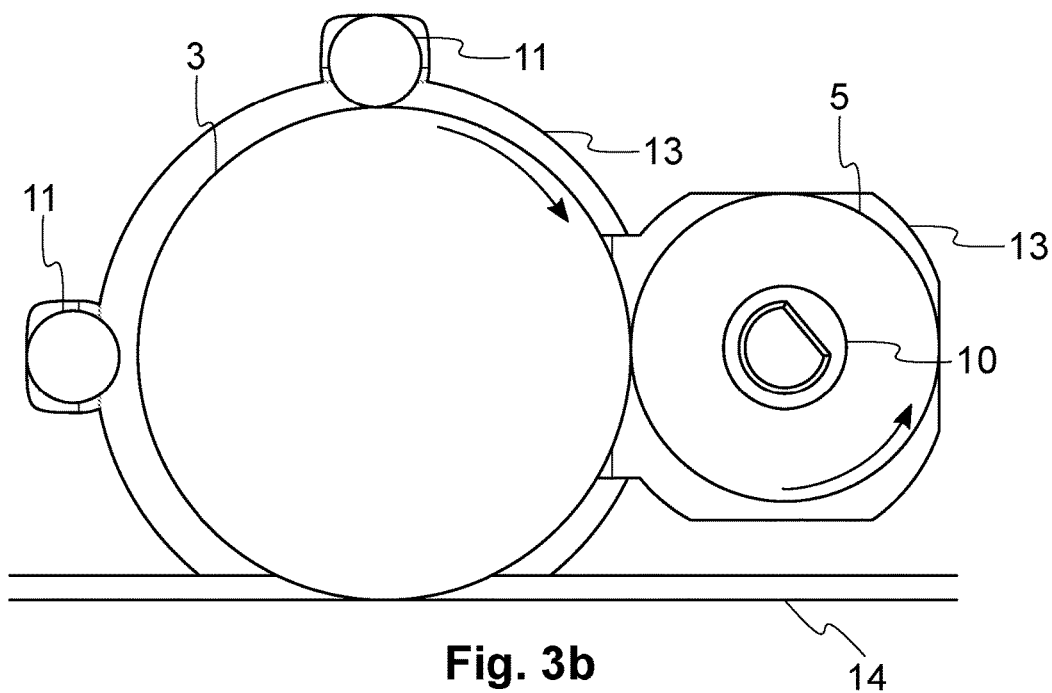

When the robot is externally manipulated, either the ball wheel 3 rests against the opposite ball transfer 11 as seen in FIG. 3a or the drive wheel 5 rests against the frame 13 as seen in FIG. 3b), depending on the actuation and manipulation forces. This redirects all external manipulation loads to ball transfers 11 and/or the frame 13 and prevents them from resulting in shear loads on the drive shaft 11. Although this method may result in reduced precision, increased friction and backlash at the ball wheel level, it adds robustness against human interaction and potentially increases motor and gearbox lifetime using no extra parts. In FIGS. 3a and 3b, the arrows indicate the direction of the rotation for the ball wheel 3 and the drive wheel 5. In FIG. 3a, the direction of motion is to the left, whereas in FIG. 3b the motion is to the right. FIGS. 3a and 3b also show a surface 14, which in this example is substantially flat, on which the ball wheel 3 can move.

Figure 4A:
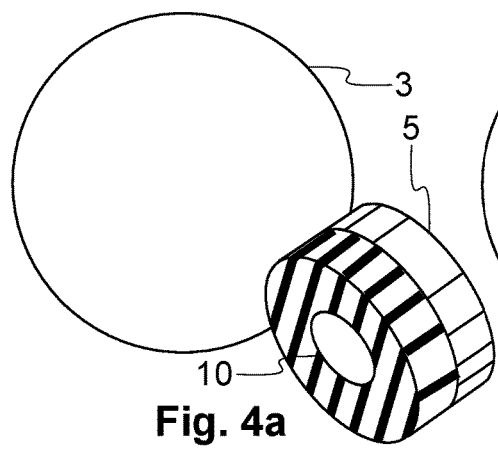
FIGS. 4*a*-4*e* are schematic illustrations of different ball wheel and drive wheel configurations according to various examples of the present invention.
Figure 4B:
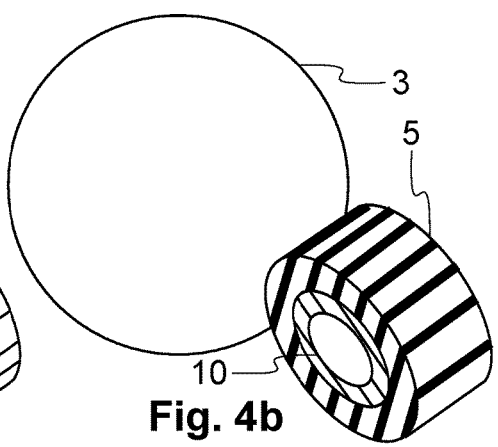

There are many possible wheel (i.e. the ball wheel and drive wheel) configurations to obtain the required magnetostatic interactions as schematically illustrated in FIGS. 4a to 4e, where no hashing indicates a passive magnetic region, i.e. the ferromagnetic region, the thick hash lines indicate a first end of a magnet, while the thin hash lines indicate a second end of the magnet. The first end may be a magnetic south pole, while the second end may be a magnetic north pole, or vice versa. A first configuration is illustrated in FIG. 4a. The first configuration is the one explained above with reference to FIG. 1. In this configuration, the ball wheel 3 is the passive magnetic element, while the drive wheel 5 is an axially magnetized magnet. The location of the magnetic poles (north and south) may be interchanged. FIG. 4b illustrates a second configuration. According to the second configuration, the drive wheel 5 is a radially magnetized magnet (poles radially on the inside and outside), while the ball wheel 3 is a passive magnetic element. In other words, the circumferential region of the drive wheel 5 has a first magnetic polarity, while a region facing the drive shaft 9 has a second, different magnetic polarity. The location of the magnetic poles (north and south) may be interchanged. Compared to axial magnetization, radial magnetization generally provides more gain on the magnetic field strength around the position where the ball wheel would reside, since one of its poles would be significantly closer to that position. However, radially magnetized monolithic permanent magnets are difficult to manufacture and are therefore expensive. For this reason, they are often manufactured in multiple segments, which are magnetized separately and then glued together. Axial magnetization may be more desirable if the necessary magnetic field strength can be generated and the ball wheel can rest against the height of the magnet (i.e. is not unconditionally pulled all the way toward the poles) using conventional magnets of appropriate sizes.

Figure 4C:
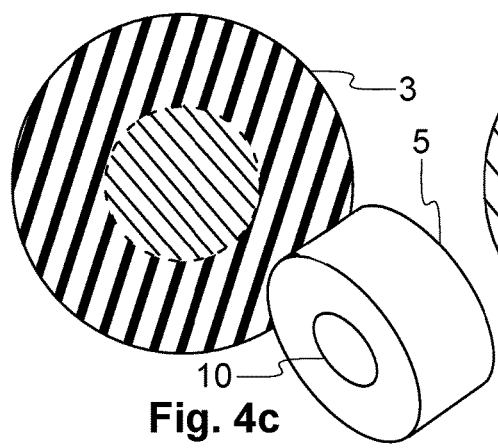

FIG. 4c illustrates a third configuration. According to the third configuration the drive wheel 5 is a passive magnetic element (i.e. the ferromagnetic element with no permanent magnetization), while the ball wheel 5 comprises the magnet. A first magnetic polarity is on the outside, while a second, different magnetic polarity is on the inside of the ball wheel 3, or vice versa.

Figure 4D:
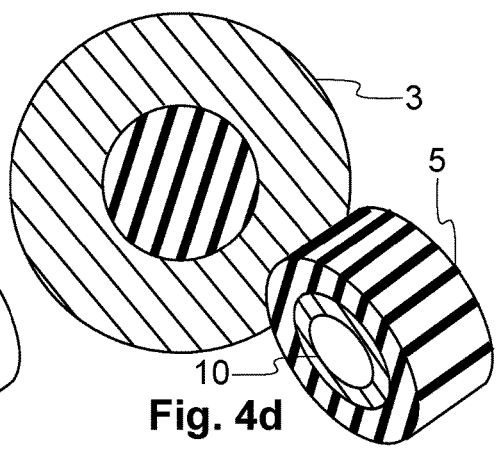
Figure 4E:
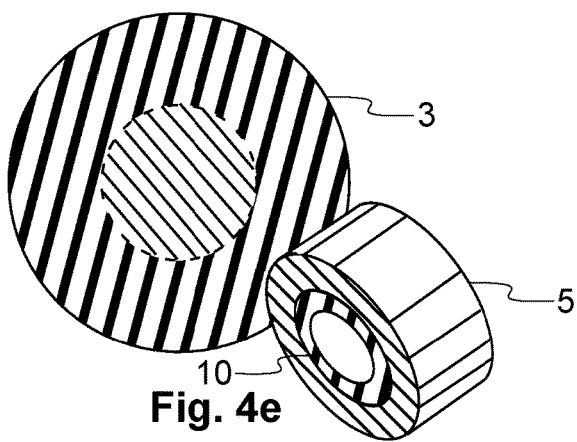

FIG. 4d illustrates a fourth configuration. In this configuration, both the ball wheel 3 and drive wheel 5 are magnets. A first magnetic polarity is on the outside of the ball wheel 3, while a second, different polarity is on the inside of the ball wheel 3. The first magnetic polarity is also on the inside of the drive wheel 5, while the second magnetic polarity is on the outside of the drive wheel 5. As can be seen in FIG. 4d, the drive wheel 5 is radially magnetized. Thus, the first magnetic polarity of the ball wheel 3 is in contact with the second, opposing polarity of the drive wheel 5. In this manner, the required pull force $F_{pull}$ can be obtained. FIG. 4e illustrates a fifth configuration, which is almost identical to the fourth configuration with the only difference being that in the fifth configuration the magnetic polarizations are reversed compared to the fourth configuration.

In the configurations of FIGS. 4a, 4b, 4d and 4e, the drive wheel 5 may be a permanent magnet or a non-permanent magnet, which can be obtained by an electromagnet or by a collection of electromagnets, where the necessary currents are synchronized. For practical reasons, in the third, fourth and fifth configurations shown in FIGS. 4c, 4d and 4e, respectively, the ball wheel 3 is a permanent magnet. An electromagnet is a special type of magnet in which the magnetic field is produced by an electric current. Electromagnets typically consist of an insulated wire wound into a coil. A current through the wire creates a magnetic field, which is concentrated in the center of the coil. The wire turns are often wound around a magnetic core made from a ferromagnetic or ferrimagnetic material, such as iron. The magnetic core concentrates the magnetic flux and makes a more powerful magnet. It is to be noted that in the second, fourth and fifth configurations, the radially magnetized magnets may be obtained either by using one magnet or a collection of magnets. If a collection of magnets is used, then the magnets in the collection may be diametrally magnetized magnetic segments which may be attached together by gluing, for example, to obtain a piecewise produced magnet.

Figure 5:
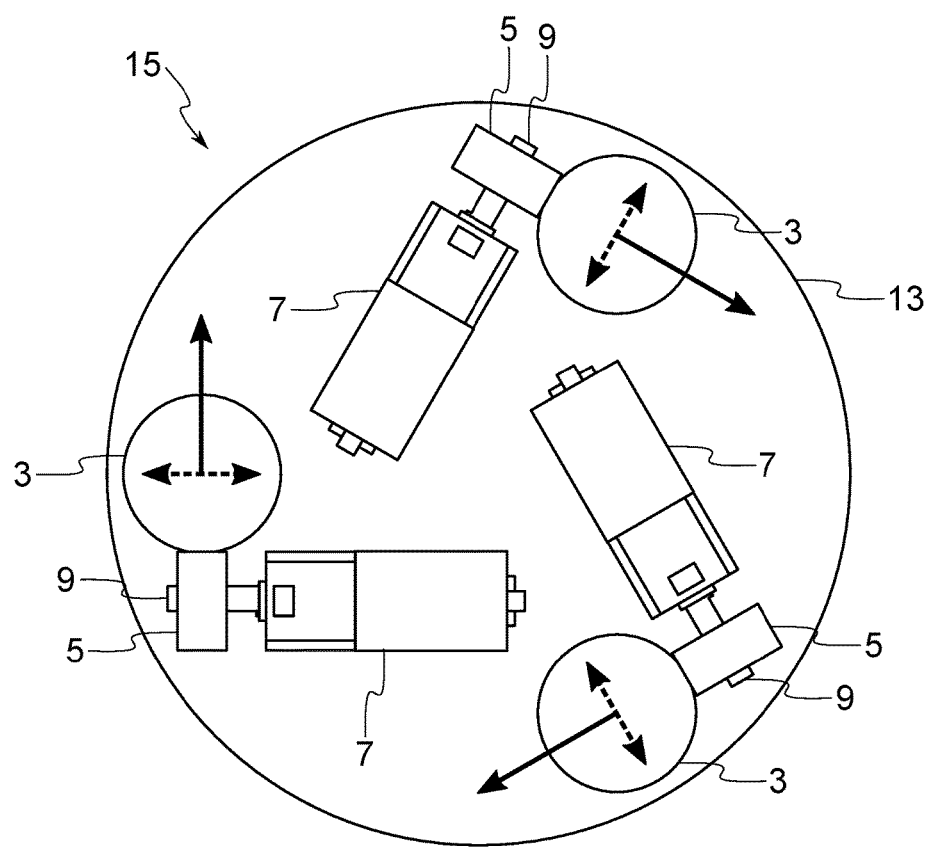
FIG. 5 is a cross-sectional top-down view of the proposed magnet-assisted ball drive entities when located in a robot according to an example of the present invention.

FIG. 5 is a cross-sectional top-down view of a robot 15, where the teachings of the present invention may be applied. The solid arrows indicate the controlled direction of motion of each ball wheel 3, whereas the dashed arrows indicate the uncontrolled direction of motion of each ball wheel 3. In this example, the robot 15 comprises three magnet-assisted ball drive entities 1. However, the number of the drive mechanisms is not limited to three. The robot 15 could comprise more than three drive entities 1. As can be seen in FIG. 5, in this example, the ball wheels 5 are evenly distributed so that they are located at equal distance intervals.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. For example, the above teachings could also be applied to spherical joints such that the ball 3 could be a spherical joint. Furthermore, in a further variant of the present invention, there are at least two drive elements 5 per ball 3. In this manner, the ball 3 may have at least two driven axes, which may or may not be orthogonal to each other.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A magnet-assisted ball drive, the drive comprising:
a substantially spherical element, referred to as a ball, and comprising an outer surface; and
a drive wheel in contact with the ball, the drive wheel being arranged to be rotated around an axis of rotation of the drive wheel to drive the ball,
wherein the ball and the drive wheel each comprise magnetic material such that at least one of the ball and the drive wheel comprises a magnet to generate a magnetic pulling force to pull the ball and the drive wheel against each other, and wherein the drive wheel is located outside of the ball and is in contact with the outer surface of the ball for driving the ball.

2. The drive according to claim 1, wherein the magnet is a permanent magnet.

3. The drive according to claim 1, wherein the magnet is a non-permanent magnet.

4. The drive according to claim 3, wherein the non-permanent magnet is an electromagnet.

5. The drive according to claim 1, wherein one of the ball and drive wheel is a passive magnetic element.

6. The drive according to claim 5, wherein the passive magnetic element comprises ferromagnetic material.

7. The drive according to claim 1, wherein the ferromagnetic material comprises iron, nickel or cobalt or any combination of them.

8. The drive according to claim 1, wherein the drive wheel comprises the magnet, which is radially polarized so that a first magnetic polarity is on the outside of the drive wheel, while a second, different polarity is on the inside of the drive wheel.

9. The drive according to claim 8, wherein also the ball comprises the magnet such that the first magnetic polarity is on the inside of the ball, while the second magnetic polarity is on the outside of the ball.

10. The drive according to claim 1, wherein the drive wheel comprises the magnet, which is axially polarized so that a first magnetic polarity is at one end of the drive wheel, while a second, different polarity is at a second, opposing end of the drive wheel.

11. The drive according to claim 1, wherein the drive wheel has a cylindrical shape.

12. The drive according to claim 1, wherein the ball comprises a friction coating on the outside.

13. The drive according to claim 12, wherein the friction coating is a rubber coating.

14. The drive according to claim 1, wherein the drive wheel is a drive wheel.

15. A drive entity comprising the drive according to claim 1, and further comprising a drive unit comprising a drive shaft connected to the drive wheel for rotating the drive wheel, wherein the drive entity further comprises a housing for receiving the drive and the drive unit, and wherein the drive entity comprises omnidirectional bearings between the housing and the ball.

16. The drive entity according to claim 15, wherein the drive unit is not fixed to the housing thereby enabling the drive unit to move within the housing.

17. A robot comprising at least three drive entities according to claim 15 enabling the robot to move omnidirectionally in a plane.

18. The robot according to claim 17, wherein the robot is a palm-sized handheld robot.

* * * * *